B. KUHNS.

Grain-Drills.

No. 5,432.

Reissued June 3, 1873.

Witnesses.
A. Ruppert.
W. Bradford

B. Kuhns
Inventor.
D. P. Holloway & Co
Attys

AM. PHOTO-LITHOGRAPHIC CO. N.Y. (OSBORNE'S PROCESS.)

UNITED STATES PATENT OFFICE.

BENJAMIN KUHNS, OF DAYTON, OHIO.

IMPROVEMENT IN GRAIN-DRILLS.

Specification forming part of Letters Patent No. 116,719, dated July 4, 1871; reissue No. 5,432, dated June 3, 1873; application filed January 21, 1873.

*To all whom it may concern:*

Figure 1:
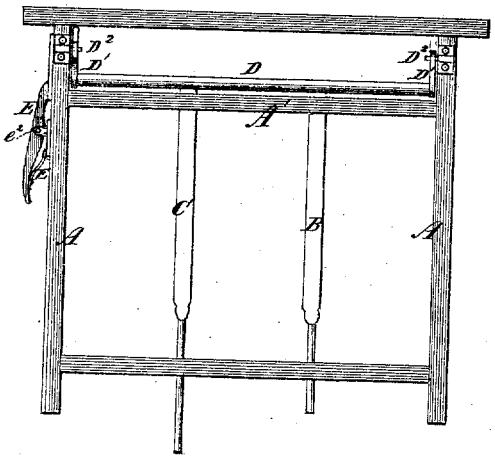
Figure 2:
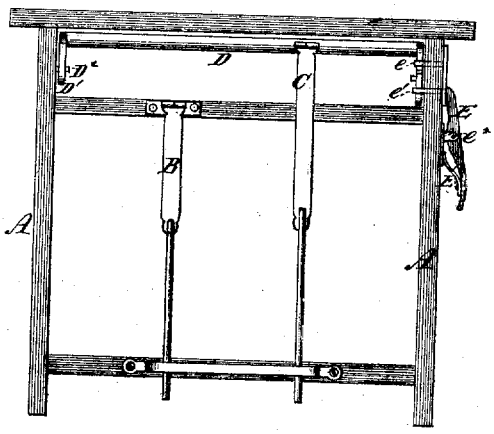
Figure 3:
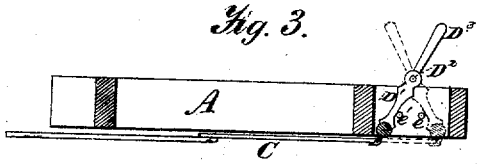

Be it known that I, BENJAMIN KUHNS, of Dayton, in the county of Montgomery and State of Ohio, have invented certain new and useful Improvements in Grain-Drills, of which the following is a specification:

Figure 1 is a plan view of so much of the frame of a grain-drill as is necessary to illustrate my invention. Fig. 2 is a bottom view thereof. Fig. 3 is a longitudinal section.

Corresponding letters refer to corresponding parts in the several figures.

This invention relates to that class of grain-drills in which the hoes or shovels which form the trenches into which the grain is to be delivered are so arranged that they may be changed from a single parallel row to two rows, one of which shall be in advance of the other; and my improvement consists in the combination and arrangement of some of its parts, as will be more fully described hereinafter.

In the annexed drawings, A refers to the frame-work of a grain-drill, which is constructed with a cross-beam, A′, to which the stationary drag-bars B, carrying the stationary hoes or shovels, are hinged. Every alternate one of the drag-bars is movable; and those marked C are hinged to a bar, D, located in front of the cross-bar A′. This bar extends from side to side of the frame, it being attached to its longitudinal beams, and has an arm, $D^1$, at each end, by means of which it is suspended from projecting studs $D^2$, which are securely fastened to the frame. These studs may, however, be formed on the arms of the bar, and turn in suitable bearings on the frame A, if preferred.

One of the arms is extended above the pivot $D^2$, so as to form a suitable handle, $D^3$, by means of which the bar D may be oscillated, and the position of the hoes or shovels which are attached thereto changed.

It will be understood that, on drawing the machine forward, the hoes or shovels, entering the earth, will oscillate the bar D rearward as far as its arms are permitted to swing, they being arrested in their movements by coming in contact with the cross-bars of the frame.

The bar D is locked or held in its different positions by locking bolts or studs *e e′*, which play through apertures in the frame, or through plates of metal attached thereto, said bolts being arranged to hold the oscillating bar in either of the positions shown in the drawing; or, in other words, in its forward or rearward position.

When the hoes or shovels are all to stand in a parallel row the lower arm of the bar D is carried forward of the stud *e*, as shown in dotted lines in Fig. 3; but when the same are arranged in two rows, or in a zigzag line, the arm will occupy the position shown in full lines in the same figure, and will be locked or held in position by the bolt or stud *e′*, it being locked in the first-named position by the stud *e*.

The studs or bolts *e* and *e′* are attached to, or form a part of, a lever, E, which is pivoted to the frame of the machine, so as to move in a horizontal plane; and that arm of said lever which carries the studs or bolts *e* and *e′* is kept in contact with the frame by means of a spring, E′, which acts upon the opposite arm of the lever, as clearly shown in Figs. 1 and 2.

On changing the hoes or shovels G from one position to the other the studs or bolts are temporarily withdrawn by pressing upon the outer end of lever E.

What I claim, and desire to secure by Letters Patent, is—

1. In a grain-drill, the combination of an oscillating bar, to which a portion of the drag-bars are attached, and locking bolts or pins, arranged substantially as described, for the purpose of holding the oscillating bars in position, as set forth.

2. In combination with the oscillating bar D, to which the changeable drag-bars are attached, and its arms $D^1$ $D^1$, the studs *e e′*, which play through the side beam of the frame, and are retracted and projected by means such as described, or equivalent means, all operating in the manner set forth.

In testimony whereof I have signed my name to the foregoing specification in the presence of two subscribing witnesses.

BENJAMIN KUHNS.

Witnesses:

W. WENTSCHOFF,

V. P. VAN HORNE.